United States Patent [19]

Kladnig

[11] Patent Number: 5,032,376
[45] Date of Patent: Jul. 16, 1991

[54] METHOD FOR PRODUCING ALUMINUM TITANATE

[75] Inventor: Wolfgang Kladnig, Vienna, Austria

[73] Assignee: Maschinenfabrik Andritz Actiengesellschaft, Graz-Andritz, Austria

[21] Appl. No.: 413,609

[22] Filed: Sep. 28, 1989

[30] Foreign Application Priority Data

Sep. 30, 1988 [AT] Austria ................................. 2421/88

[51] Int. Cl.⁵ ........................ C01G 23/04; C01F 7/02; C01F 1/00; C04B 35/46
[52] U.S. Cl. ....................................... 423/598; 423/71; 423/115; 423/608; 423/625; 423/626; 423/DIG. 1; 423/DIG. 2; 501/127; 501/134; 501/153
[58] Field of Search ................ 423/598, 81, 600, 608, 423/DIG. 2, DIG. 1, 71, 115, 125, 625, 626; 501/134, 127, 153; 106/442

[56] References Cited

U.S. PATENT DOCUMENTS 2,019,553 11/1935 Willmore ............................ 423/125
3,713,786 1/1973 Umstead ....................... 423/DIG. 2
4,746,638 5/1988 Hori et al. ........................... 501/127

FOREIGN PATENT DOCUMENTS 1397717 6/1975 United Kingdom .

OTHER PUBLICATIONS

Thomas, H. A. J. et al., "Aluminum Titanate–a Literature Review, Part 3, Preparation of Powders," pp. 229–233, 1989.
Barksdale, J, "Titanium, Its Occurrence, Chemistry, and Technolgy", 1966, p. 107.

Primary Examiner—Michael L. Lewis
Assistant Examiner—Steven Bos
Attorney, Agent, or Firm—Fleit, Jacobson, Cohn, Price, Holman & Stern

[57] ABSTRACT

An improved method for producing aluminum titanate powder material for making aluminum titanate ceramics.

16 Claims, 1 Drawing Sheet

METHOD FOR PRODUCING ALUMINUM TITANATE

BACKGROUND OF THE INVENTION AND PRIOR ART

1. Field of the Invention

This invention relates to a method for producing aluminum titanate in the form of a powdered primary material, ready for making aluminum titanate ceramics, by conventional ceramic techniques. The invention also relates to a method for producing the mixed oxide powder from spent pickle liquor from titanium production by adding aluminum scrap or alumina salts to the same, or equally from aluminum or titanium scrap dissolved in acidic mixture, in both cases by complete recovery of the acids and production of the oxides, which after thermal treatment give the aluminum titanate material.

2. Description of the Prior Art

Aluminum titanate is a chemical component, usually made from aluminum oxide and titanium dioxide powders after intensive mixing by a solid state reaction. It has gained considerable interest for its application in engineering ceramics, especially for motor engine construction material due to its low thermal expansion, as well as high thermal stability, for example to be used as a port liner insulating material. But also its suitability as a refractory material for insulations in ovens, or its application in metal casting or glass melting as crucible material or in form of discharge grooves, has been reported. In general this material is suggested for applications where high resistance to thermal shocks is required.

Aluminum titanate, physically spoken, is a solid solution between $Al_2O_3$ and $TiO_2$ with the formula $Al_2TiO_5$ ($AL_2O_3.TiO_2$) with the molecular weight 182.1. It is a white powder or after solid forming a white ceramic material.

Production methods by solid state reaction starting from well mixed powders of $Al_2O_3$ and $TiO_2$ are described in patents EP-0036052 (1983), EP-0036462 (1983), EP0036868 (1983), U.S. Pat. No. 2,776,869 (1952), FR-PS No. 1.349,020 (1963) or DDR-PS No. 29.794 (1962). Although it is obviously simple to produce, in fact the reaction kinetics are slow and the product formation from its powdered precursors is reported to proceed at elevated temperatures, over 1600° C., in oxidising atmosphere and very long firing times of ten to twenty hours. Within the temperature range of 800° C. and 1100° C. the reaction is completely reversible, which means that the production of aluminum titanate is immediately followed by its decomposition. The reaction selectivity of this solid state process thus reported seems not to be easily achieved to yield in complete transformation of its precursors.

Further processes, yet scarcely reported for this special product, is the sol-gel route to get the product by precipitation and hydrolysis reactions from the corresponding metal—, i.e. aluminum- and titanium-alcoholate precursors and subsequent calcination to the final product.

Aluminum titanate powder thus formed by one of these processes then can be transferred to the final ceramic form by slip casting, extrusion or cold powder pressing and final sintering. The ceramic has excellent thermal stability up to 1850° C. and outranging thermal shock stability. The final product $Al_2TiO_5$ is composed of 56% $Al_2O_3$ and 44% $TiO_2$. It crystallizes orthorhombic, Cmcm space groups, and the industrially one used relates to the β-crystallographic form, also called tialite.

SUMMARY OF THE INVENTION

The method described here is a completely new route to make aluminum titanate, starting from its corresponding metals, aluminum and titanium, most economically from the clean scrap of aluminum and titanium production, which subsequently is dissolved in mixtures of nitric and hydrofluoric acids. The starting material to make the aluminum titanate described here also may be the use of pure spent pickle liquors, i.e. mixtures of the usually applied nitric and hydrofluoric acids of 150–300 g/l $HNO_3$, (15–20 weight percent) of nitric acid and 50–70 g/l HF, (3–5 weight percent) hydrofluoric acid. Such used, or spent, pickle acids, as frequently applied in titanium metal production, normally contain 25–30 g Ti/l dissolved. To get the reaction done, aluminum metal, preferably in the form of scrap has to be added in stoichiometric amounts to the same liquor, which dissolves it very fast. But also aluminum salts dissolved in water, or possibly in the same liquor, can be used alternatively, such as aluminum nitrate $Al(NO_3)_3.9H_2O$ or aluminum chloride, $AlCl_3.6H_2O$ or aluminum fluoride $AlF_3.H_2O$.

In addition, a mixture of solution may be obtained by dissolving of aluminum and titanium scrap which are then added to the starting solution to yield a ratio of Al:Ti equal to 2:1. The aluminum and titanium scrap may also be added to an inorganic aqueous solution of aluminum nitrate to yield a ratio of Al:Ti equal to 2:1.

The first object of the invention is to make aluminum titanate from scrap of Al and Ti metals.

The second object of the invention is to recover spent pickle acids of titanium metal production, of hydrofluoric and nitric acids, which however, has been described and applied for patents elsewhere (Austrian Patent Application No. A 1534/1987 and EP-A$_1$-0 296 147.

The third object is to obtain a mixture of sprayed powders of alumina, $Al_2O_3$, and titanium dioxide, $TiO_2$, intensively mixed and in high reactive state.

The fourth object of the invention is to make the compound, aluminum titanate (or tialite, β-$Al_2TiO_5$) by subsequent thermal treatment of the powder mixture gained by the beforementioned reaction step in a complete (100%) and in a fast (within one to two hours) way.

The fifth object of this invention is to get the mentioned product at lower temperatures as usually described, thus to have a better energy balance in the formation of the product, because of the faster reaction of the sprayed powder mixture and its high reactive state. Thus the reaction proceeds faster and at lower temperatures making the production route more profitable.

The sixth object of the invention is to have spent pickle liquors of the usual titanium metal production route of surface treatment being recovered by this thermal treatment and at the same time having the ability to make the aluminum titanate ceramic primary material as a by-product of this acid recovery.

The seventh object is the recovery of the inorganic acids, i.e. nitric, hydrofluoric and hydrochloric acids, either individually or as a mixture from the spray roast process at a temperature between 0° C. and 70° C.

In accomplishing these objects there is provided, according to the invention, a process starting e.g. from pickling acid of titanium metal from a usual way of surface treatment of metal parts, such as tubes, wire, sheet, etc., containing titanium metal. This pickling acid with the titanium metal dissolved in it is usually matter of disposal. Such liquors further contain nitric acid and hydrofluoric acid. The method described here is a way to recover each of the acids by absorptive material, ready for being transferred back to the metal treatment process and at the same time to make use of the titanium metal dissolved in them. The corresponding aluminum compound necessary in stoichiometric amounts for achieving the transfer to the chemical compound described here, has to be added to the spent pickle liquors, most economically in the form of aluminum scrap, according to the chemical compounds stoichiometry, to get $Al_2TiO_5$. Using the same pickle liquors containing titanium, the aluminum compound may also be added in the form of an aluminum salt, preferably aluminum nitrate, $Al(NO_3)_3.9H_2O$. Alternatively either aluminum chloride or aluminum fluoride salts can be added, but in stoichiometric amounts. The addition of the aluminum compound can be performed in a separate step, most conveniently by using a dissolving tank.

The process to make aluminum titanate comprises the thermal decomposition of the acidic solution containing nitric and hydrofluoric acids, optionally also hydrochloric acid, further extra added aluminum metal and the titanium metal from the pickling process. Both aluminum and titanium have to be present in the right stoichiometric relation of Al:Ti=2:1. This liquid then is transferred to a reaction system which consists of a reactor which is made of stainless steel and may be brick insulated, and where the liquid is decomposed by means of a gas-burner or an oil burners flame or flames. Thus a thermal decomposition of the sprayed and then evaporated solution takes place, in which a thermal hydrolysis, better called a pyro-hydrolysis, takes place, in which the free acids as well as the corresponding acids of dissolved salts are transferred into the gas phase. These acids are usually hydrofluoric acid, HF, and nitric acid, $HNO_3$, and possibly also hydrochloric acid, HCl. The reaction takes place in the temperature range of 200° to 600° C., most economically at about 400° C. The oxides which subsequently are formed in the flame zone and which are collected at the bottom of the reactor are transferred to a rotary kiln for further treatment. The freshly formed oxidic mixture of $Al_2O_3$ and $TiO_2$ usually contains some already formed aluminum titanate and is in a very fine and ideally mixed state, crystallographically in microcrystalline and also in amorphous form, with very high surface areas. It allows the final thermal reaction towards the end product, $Al_2TiO_5$, Tialite, or -Aluminum-titanate by fast heating at about 1300° C. within 4 hours or at 1500° C. within 2 hours to 100% conversion degree. This thermal treatment is preferably done in a rotary kiln. Product formation by this method takes place within much shorter time and at temperatures which can be kept considerably lower than in conventional processes.

The chemical decomposition of the solutions and the physical reactions which take place in the reactor system are:

1) $Al + HF + 3HNO_3 = Al(NO_3)_3 + HF + 3/2\ H_2$
2) $Ti + 4HF + HNO_3 = TiF_4 + 2H_2 + HNO_3$
3) $HF\ (aq) = HF\ (g)$
4) $HNO_3\ (aq) = NO_x(g) + \frac{1}{2}O_2(g) + \frac{1}{2}H_2O$
5) $NO_x(g) + \frac{1}{2}H_2O = HNO_3$
6) $Al(NO_3)_3 + 3/2 H_2O = \frac{1}{2}Al_2O_3 + 3HNO_3$
7) $TiF_4 + 2H_2O = TiO_2 + 4HF\ (g)$ The tialite powder made by the new process is ready for further ceramic processing such as compating by presses or by slip casting or other molding techniques. The ceramics made from such a powder of the process described here show good densities after final sintering. Tialite ceramics made of a powder as herein described have high thermal shock stability, high compressive strength and good mechanical stability.

Ceramic material made according to the process described here can be employed preferably for refractory uses, or in reactor linings, for all heat resistant linings, or to make refractory bricks for kiln linings or to insulate glass melting vessels or to make casting forms or crucibles for metal casting.

The advantage of the process lies in the possibility to obtain the material, in form of its powder, as a side product from titanium metal pickling or by effectively using titanium and aluminum metal scrap.

The acids to be used to dissolve the scrap as described are nitric acid, $HNO_3$, hydrofluoric acid, HF (and/or hydrochloric acid HCl), usually in the relation of 1:1 up to 1:5.

BRIEF DESCRIPTION OF THE DRAWING

The invention is described in the following with reference to the drawing.

The drawing is a block diagram of a plant to recover spent pickle acid and to obtain a powder mixture ready for being transferred to the final product. It further comprises a rotary kiln to have a further thermal treatment done to get the final product. It also comprises a scrap or salt solution tank to have aluminum, as a second component, available to be added in the form of scrap or aluminum salt.

Figure 1:
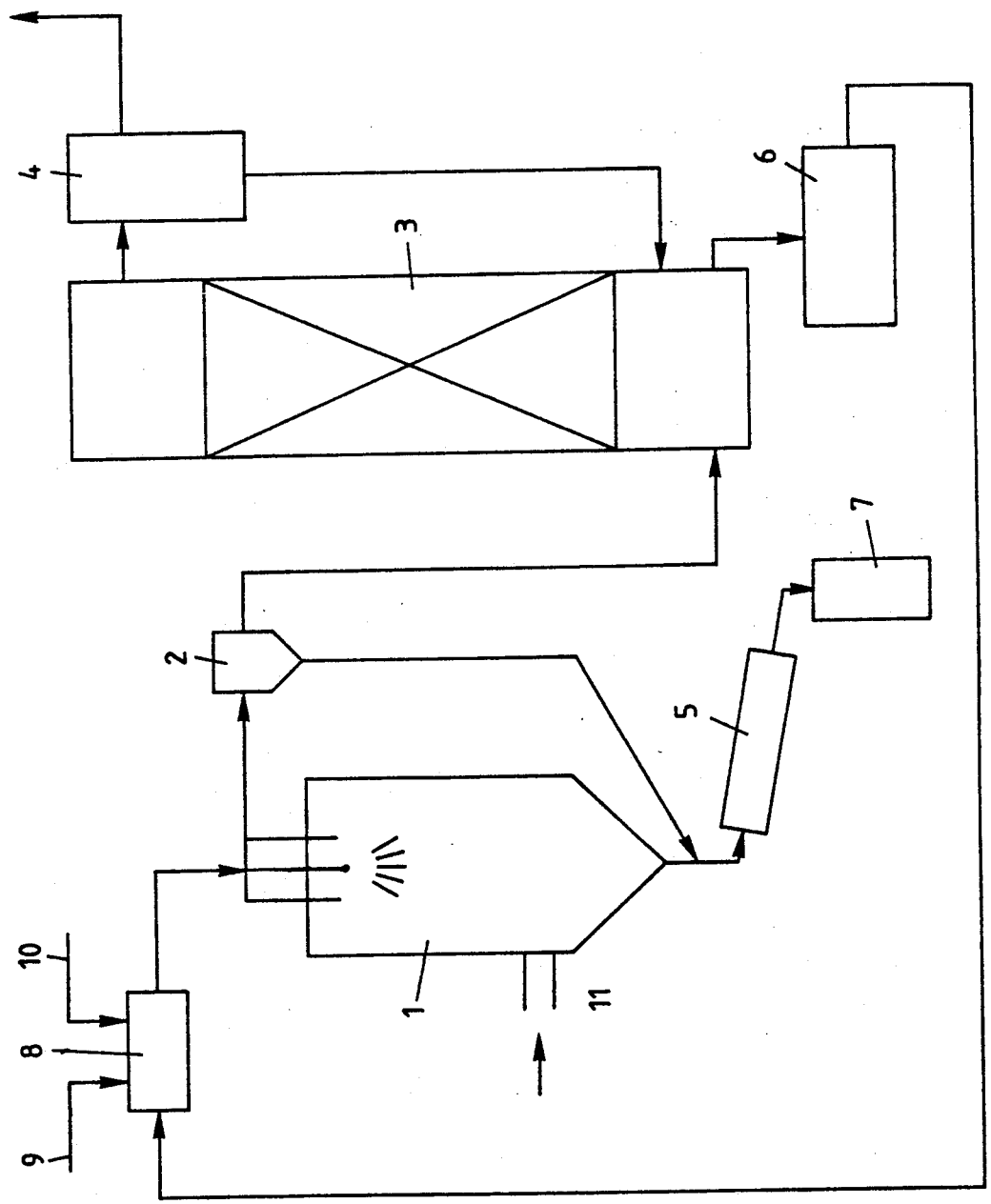

In the drawing a reactor is denoted as 1 to which the solution to be processed is supplied by a metering pump and subsequently sprayed into a hot gas zone by means of an atomizer nozzle. Heating of the reactor proceeds for example by means of a gas burner 11 fitted close to the bottom end of the reactor. At the bottom of the reactor conus, a discharge apparatus is provided for continuous discharge of the solids formed by the thermal decomposition of the acidic solution. The hot flue gases are passed from the top of the reactor 1 to a cyclone device 2, for recovery of solid particles. Thereafter the flue gases enter an absorption-condensation plant 3, composed of a single or of multiple columns, optionally fitted with absorptive aids, such as Rasching rings. The absorption liquor is withdrawn by suction from the bottom and by means of pumps. The acid mixture such composed and collected in 6, which is the recovery acid tank, can be subsequently transferred to a solution tank 8. The primary materials, such as titanium, in form of metals scrap, or spent titanium pickle liquor, denoted as 9 in the drawing, and the aluminum scrap or alumina salt which has to be added in stoichiometric amount, 10 in the drawing, are both continuously fed to the tank 8. Flue gases which finally leave the system described in the drawing are scrubbed, or denoxed, by conventional methods, indicated in box 4 of the drawing before leaving to the atmosphere.

The powder produced in reactor 1 of the drawing is continuously transfered to a rotary kiln 5, from which it is further transported by conventional powder transportation conveying systems towards a powder hopper, denoted as 7 in the drawing.

EXAMPLES

Example 1

A solution consisting of 25 g Al/l (0.85 mol/l) and 20.5 g Ti/l (0.43 mol/l) in HF of 2 mol/l and $HNO_3$ of 2 mol/l is transferred to the reactor (1 in the drawing) by means of a pump and sprayed into a heated hot gas zone at a temperature of 400° C. The acid recovery by means of this system, described in the drawing, was approx. 90% of HF and $HNO_3$. This model solution of the typical metal content of Ti which reflects the usual spent pickling acids in titanium metal pickling, of 20-30 g Ti/l, and acid contents of 2-3 weight percent HF and approx. 15 weight percent $HNO_3$, has been chosen to match a real case. For technical purposes, i.e. if scrap is used instead of a spent pickling acid, also higher concentrations of up to 100 g/l Al and 82 g/l Ti can be used instead, because of the excellent solubility of both metals in the described $HF/HNO_3$ acid mixture.

Example 2

Titanium Ti (0.43 mol/l) equals 20.5 g/l dissolved in HF (2 weight percent) and $HNO_3$ (15 weight percent) and 320 g/l $Al(NO_3)_3.9H_2O$ salt, dissolved in water, are combined and transferred into the reactor, in the way as described in Example 1. The decomposition reaction within the reactor can take place in the temperature range of in between 300° to 600° C. It should be mentioned that the higher the temperature of the thermal decomposition of the solution, the higher the NOx content of the flue gas to be formed which thereafter has to be denoxed.

Example 3

The powders formed by the process described in Example 1 and Example 2 are of white colour with a powder bulk density of inbetween 0.3-0.4 g/ccm, and a specific surface area (B.E.T) of inbetween 30-40 $m^2/g$ and a usual humidity of 1-2%, which of course is dependent on the reactor temperature. The powder particle size distribution after a thermal decomposition of the solution at 400° C. gives a mean particle size of 20-22 micrometer, which is also typical for a very fine spray dried powder. The crystallographic analysis of such a powder usually reveals the crystallographic phases of $\alpha$-$Al_2O_3$, $\beta$-$Al_2O_3$, $TiO_2$ (anatase), AlOOH (boehmite) and sometimes also already and spontaneously formed tialite, $Al_2TiO_5$.

EXAMPLE 4

Subsequent reaction sintering of such a powder described in Example 3 at a fast temperature cycle time in a rotary kiln, at 1350° C. (up to 1500° C.) in its hot zone, and at a contact time in the hot zone of two hours up to four hours, usually leads to 100% Tialite, $Al_2TiO_5$, of the orthorhombic structure Cmcm, with a specific surface area (B.E.T.) of 2 $m^2/g$ to 4 $m^2/g$ and a particle size distribution of around 20 microne mean particle size. This powder can be ball milled to a mean particle size of 2 to 6 micrones.

EXAMPLE 5

To make a final ceramic from the powder obtained in Example 4, the powder was compressed in a uniaxial working hand press, at room temperature, at 100 to 150 MPa to tablets, which had a green (unsintered) density of 2.0 g/ccm up to 2.1 g/ccm. These tablets were then subsequently transferred to a muffle to be sintered at 1500° C. for 1 hour. After sintering the tablets had a density of 2.9 g/ccm to 3.0 g/ccm. Crystallographically the tialite tablets remain unchanged. No decomposition was observed. The so formed ceramic was tested on its mechanical and thermal stability to give the following values: thermal shock stability (1550°/20° C.) by immediate water quenching: a minimum of 3 cycle times; thermal conductivity (W/MoK): 2.0; thermal expansion coefficient (10 exp 6/degr.C): 2.0; modulus of rupture (MOR) in (MPa) 20-40.

What we claim is:

1. Process for producing aluminum titanate comprising:
   a) preparing a solution of aluminum and titanium in a mixture of nitric and hydrofluoric acid,
   b) spray roasting of said solution at a temperature between 200° C. and 500° C. for thermal decomposition of the sprayed solution and forming of oxides of aluminum and titanium, and
   c) sintering the formed oxides to fine particulate aluminum titanate powder.

2. Process according to claim 1, wherein said solution is a spent pickle liquor from titanium metal production to which aluminum and nitric acid are added to yield a ratio of Al:Ti equal to 2:1.

3. Process according to claim 2, wherein solutions, obtained by dissolving of aluminum and titanium scrap, are added to the starting solution to yield a ratio of Al:Ti equal to 2:1.

4. Process according to claim 2, wherein an inorganic aqueous solution of aluminum nitrate is added to yield a ratio of Al:Ti equal to 2:1.

5. Process according to claim 2, wherein a mixture of a solution obtained by dissolving of aluminum and titanium scrap and an inorganic aqueous solution of aluminum nitrate is added to yield a ratio of Al:Ti equal to 2:1.

6. Process according to claim 1, further comprising the recovery of the inorganic acids, which are released in the spray-roasting process, at a temperature between 0° C. and 70° C.

7. Process according to claim 6, wherein said inorganic acids are recovered individually.

8. Process according to claim 6, wherein a mixture of said inorganic acids is recovered.

9. A process for producing aluminum titanate, comprising:
   a) preparing a solution of aluminum and titanium in hydrochloric acid;
   b) spray roasting of said solution at a temperature between 200° C. and 500° C. for thermal decomposition of the sprayed solution and forming of oxides of aluminum and titanium; and
   c) sintering the formed oxides to fine particulate aluminum titanate powder.

10. The process of claim 9, wherein said solution is a spent pickle liquor from titanium metal production to which aluminum and nitric acid are added to yield a ratio of Al:Ti equal to 2:1.

11. The process of claim 10, wherein solutions, obtained by dissolving of aluminum and titanium scrap, are added to the starting solution to yield a ratio of Al:Ti equal to 2:1.

12. The process of claim 10, wherein an inorganic aqueous solution of aluminum nitrate is added to yield a ratio of Al:Ti equal to 2:1.

13. The process of claim 10, wherein a mixture of a solution, obtained by dissolving of aluminum and titanium scrap and an inorganic aqueous solution of aluminum nitrate is added to yield a ratio of Al:Ti equal to 2:1.

14. The process of claim 10, further comprising the recovery of the inorganic acids, which are released in the spray roasting process, at a temperature between 0° C. and 70° C.

15. The process of claim 14, wherein said inorganic acids are recovered individually.

16. The process of claim 14, wherein a mixture of said inorganic acids is recovered.

* * * * *